United States Patent [19]

Loiseau

[11] 4,307,843

[45] Dec. 29, 1981

[54] SLICER FOR FOOD PRODUCTS

[75] Inventor: Bernard Loiseau, Dijon, France

[73] Assignee: SEB S.A., Selongey, France

[21] Appl. No.: 114,424

[22] Filed: Jan. 22, 1980

[30] Foreign Application Priority Data

Feb. 1, 1979 [FR] France ............................. 79 02640

[51] Int. Cl.[3] ............................................ A47J 43/25

[52] U.S. Cl. ...................................... 241/93; 83/574; 241/101.1; 241/101.2; 241/273.3; 241/285 B

[58] Field of Search ................. 83/574; 241/273.3, 92, 241/101.1, 101.2, 285 R, 285 A, 285 B, 93

[56] References Cited

U.S. PATENT DOCUMENTS

| | | | |
|---|---|---|---|
| 1,513,880 | 11/1924 | Astesano | 241/101.2 |
| 1,600,123 | 9/1926 | Milici et al. | 241/101.1 |
| 1,652,132 | 12/1927 | Donald | 83/872 X |
| 2,611,406 | 9/1952 | Preble | 83/717 |
| 2,705,985 | 4/1955 | Starling | 83/872 |

*Primary Examiner*—Mark Rosenbaum
*Attorney, Agent, or Firm*—Young & Thompson

[57] ABSTRACT

The slicer for food products comprises a circular blade 2 mounted to rotate in a support-means 1, and a base 4 comprising a surface 5 for the accommodation of the product to be sliced, the said surface running substantially parallel with axis of rotation X-X' of blade 2. Base 4 is hinged along axis Y-Y' in relation to support-means 1 and comprises, at 8, a fractioning element, such as a grater and/or shaver, rotating about an axis Z-Z' at right angles to surface 5 of base 4, the said axis being located in a plane at right angles to axis Y-Y' of base 4 and passing through axis of rotation X-X' of the blade. Fractioning element 9 is provided with means for coupling it, in rotation, to blade 2, after base 4 has been pivoted towards blade support means 1.

13 Claims, 9 Drawing Figures

FIG_1
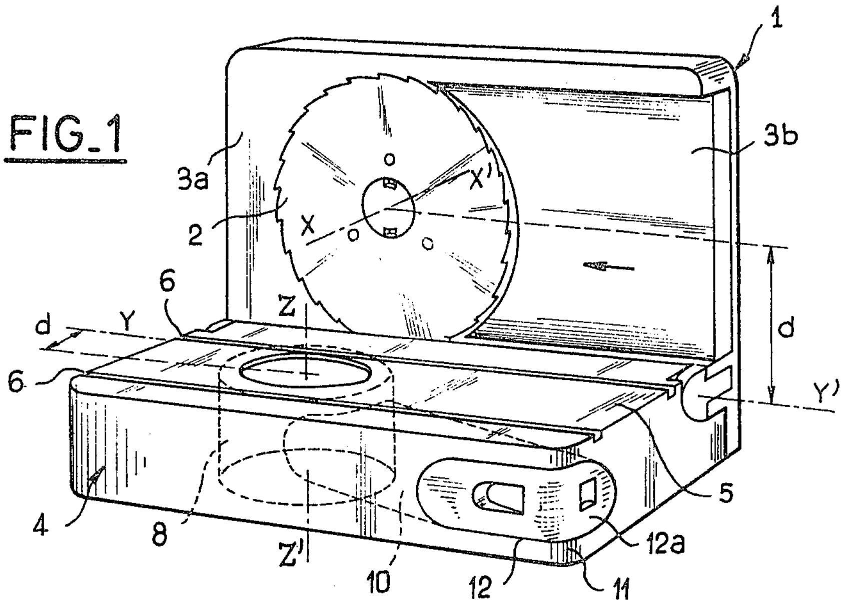
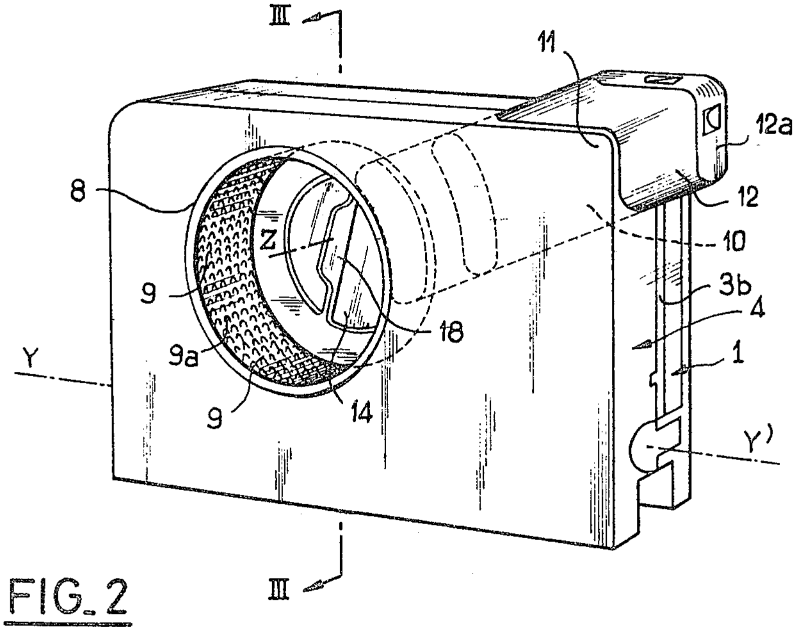
FIG_2

SLICER FOR FOOD PRODUCTS

The present invention relates to a slicer for food-products such as ham, sausage, cheese, bread and the like.

Known slicers comprise a circular blade rotating in a support-means and driven by an electric motor or, manually, by means of a crank. The support-means is in the form of a base comprising a surface for the accommodation of the product to be sliced. Generally speaking, this surface runs parallel with the axis of rotation of the blade.

The surface for the accommodation of the products to be sliced comprises, in general, a carriage mounted upon slides on the base, and serving to advance the products to be sliced towards the circular blade.

Presently-known slicers may be used only for cutting foodstuffs.

It is known that, in a household, the use of a large number of electrical appliances all performing different functions is difficult, involves considerable handling by the housewife, and frequently raises storage problems.

It is the purpose of the present invention to overcome this disadvantage and to produce a slicer which is not restricted to slicing foodstuffs.

The slicer according to the invention comprises a circular blade rotating in a support-means and a base with a surface for the accommodation of the product to be sliced, the said surface running substantially parallel with the axis of rotation of the blade.

According to the instant invention, this slicer is characterized in that the base is hinged in relation to the support-means and comprises a fractioning element such as a grater and/or shaver adapted to rotate about an axis at right angles to the said product-accommodating surface on the base, the said axis being located in a plane at right angles to the hinge-axis of the said base and passing through the axis of rotation of the blade, the axis of rotation of the fractioning element, and that of the blade, being located at equal distances from the hinge-axis of the said base and the said support-means; and in that the fractioning element comprises means permitting it to be coupled in rotation to the blade, after the base has been pivoted towards the support-means for the blade.

In order to convert the slicer into a unit for fractioning, i.e. grating and/or shaving foodstuffs such as carrots, cucumbers, celery and the like, it is merely necessary to pivot the base towards the support-means for the blade and to couple the fractioning element thereto. Thus the axis of rotation of the blade also drives that of the grater and/or shaver.

The slicer according to the invention thus combines, very advantageously, the functions of slicing and fractioning. Furthermore, when the blade is applied to the support-means, the slicer according to the invention may be stored very compactly.

According to the advantageous configuration of the invention, the base comprises a feed-funnel for products to be fractioned. This funnel may be accommodated entirely within the thickness of the base of the appliance. This produces a very compact unit requiring almost no assembling or dismantling when it is to be used or stored.

According to a preferred embodiment of the invention, the means for coupling the fractioning element in rotation comprise teeth secured to the grating and/or shaving element and adapted to mesh with teeth integral with the blade after the base has been pivoted towards the support-means for the blade.

This coupling means is particularly simple and convenient to operate, since it requires nothing more than pivoting the base towards the support-means.

Other characteristics and advantages of the invention may be gathered from the following description in conjunction with the drawings attached hereto with are by way of example and are in no way restrictive. In the said drawings:

FIG. 1 is a perspective view of the slicer according to the invention;

FIG. 2 is a perspective view of the slicer set up for grating;

Figure 3:
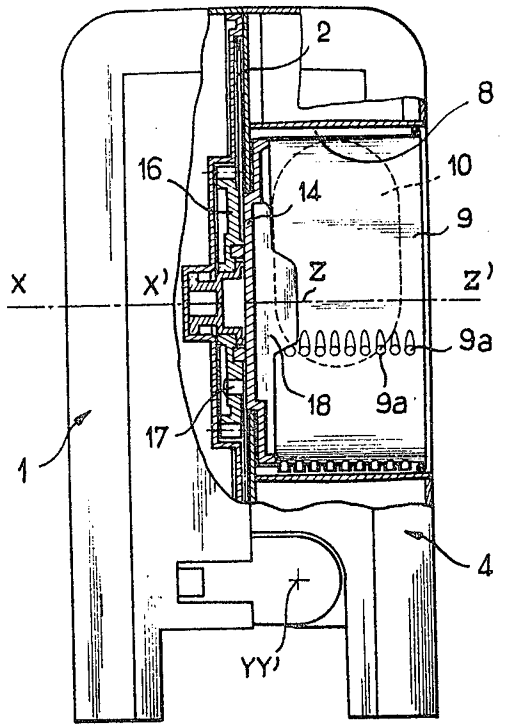
FIG. 3 is a section along the line III—III in FIG. 2, to an enlarged scale.
Figure 4:
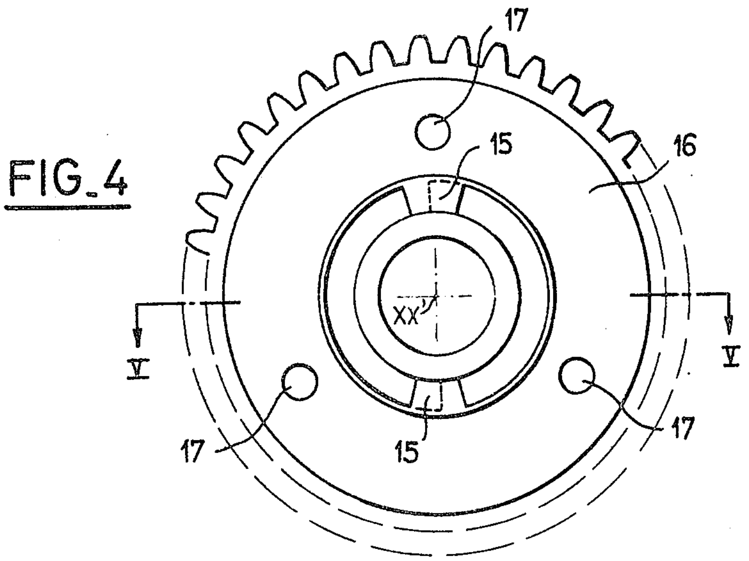
FIG. 4 is a front elevation of the pinion adapted to accomodate the circular blade of the slicer.

According to FIG. 1, the slicer according to the invention comprises a support-means 1 substantially in the form of a parallelepiped. Mounted rotatably thereon is a circular blade 2 which lies flush with front surface 3*a* of the said support means. Surface 3*b* is adjustable in depth, thus making it possible to obtain slices of the desired thickness. Blade 2 is caused to rotate about a first axis X-X' by means of an electric motor, not shown, housed in support-means 1. In the position shown in FIG. 1, support-means 1 rests upon a base 4 in the form of a parallelepiped of which the dimensions are substantially the same as those of support-means 1.

Base 4 comprises a surface 5 which runs parallel with axis of rotation X-X' of circular blade 2, and is designed to accommodate the products to be sliced, such as ham, sausage, cheese, etc . . . . Surface 5 comprises slides 6 adapted to accommodate a carriage, not shown, which allow the foodstuffs to be sliced to be advanced towards blade 2 while being pressed against surface 3 of support-means 1.

According to the invention, base 4 is hinged, in relating to support-means 1 along a second axis Y-Y' running in the vicinity of intersection 7 between surface 5 of base 4 and surface 3 of support-means 1.

Base 4 also has a cylindrical recess 8 accommodating a fractioning element 9, for example a grater and/or shaver (FIG. 2), adapted to rotate about a third axis Z-Z' at right angles to surface 5 of base 4. Axis Z-Z' is furthermore located in a plane at right angles to hinge-axis Y-Y' of base 4 and passing through axis of rotation X-X' of blade 2.

Axis Z-Z' of fractioning element 9 and axis X-X' of blade 2 are located at the same distance d from hinge-axis Y-Y' of base 4 and support-means 1.

Fractioning element 9 comprises means, to be described in greater detail hereinafter, making it possible to couple it, in rotation, to blade 2 after base 4 has been pivoted towards support means 1, as shown in FIG. 2.

It may be seen from FIG. 2 that, in this position, the unit according to the invention is a parallelepiped formed by superimposing the paralellepipeds of support-means 1 and base 4; that it is very compact; and that it is easy to store in a kitchen cupboard.

It may also be gathered from FIGS. 1 and 2 that base 4 comprises a feed-funnel or channel 10 for products to be grated and/or shaved. This funnel runs between fractioning element 9 and angle 11 of base 4 facing hinge-axis Y-Y'. This funnel contains a piston 12 for pushing the products towards the fractioning element. Outer surface 12*a* of the said piston matches the external profile of angle 11 of base 4. Thus when the said piston is completely engaged in the base, it does not project therefrom in any direction.

In the design illustrated in FIGS. 1 and 2, fractioning element 9 is a hollow cylinder of which the surface is equipped with grater projections (see also FIG. 3). This hollow cylinder is mounted detachably in recess 8 in base 4.

As may be seen from FIGS. 3 to 9, the means for coupling the fractioning element in rotation are in the form of teeth 13 secured to a disc 14 fixed to the end of fractioning element 9 adjacent surface 5 of base 4.

Teeth 13 engage with teeth 15 secured to blade-driving pinion 16 (FIG. 4) equipped with three threaded holes 17 for screws securing circular blade 2.

Figure 5:
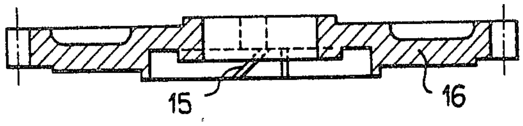
FIG. 5 is a section along the line V—V in FIG. 4.
Figure 6:
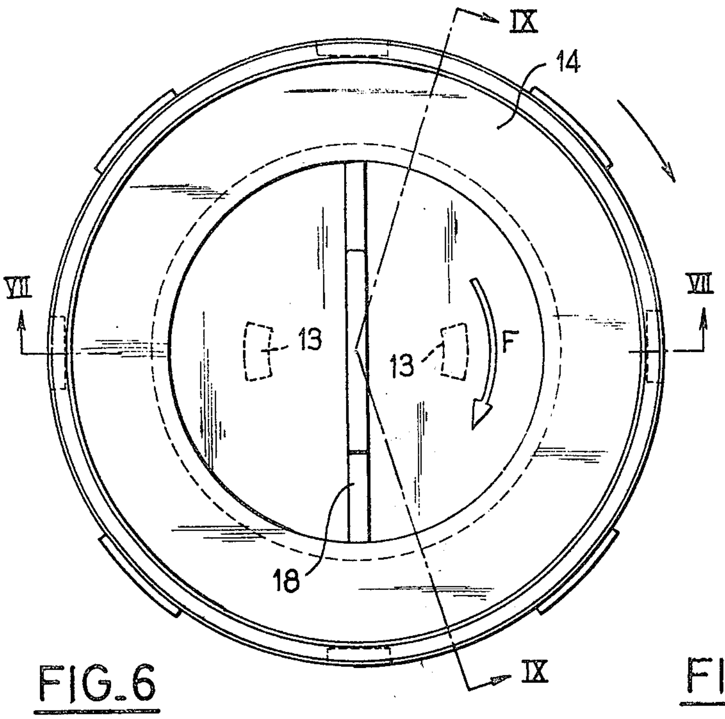
FIG. 6 is a plan view of the disc designed to accomodate the frater.
Figure 9:
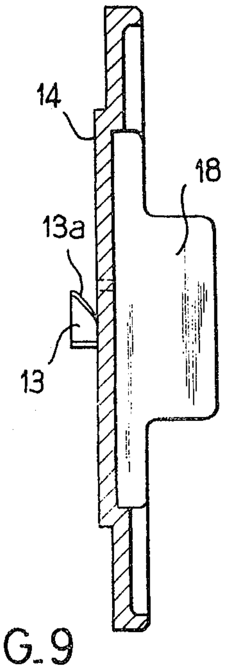
FIG. 9 is a section along the line IX—IX in FIG. 6.
Figure 7:
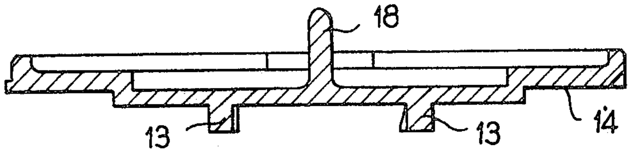
FIG. 7 is a section along the line VII—VII in FIG. 6.
Figure 8:
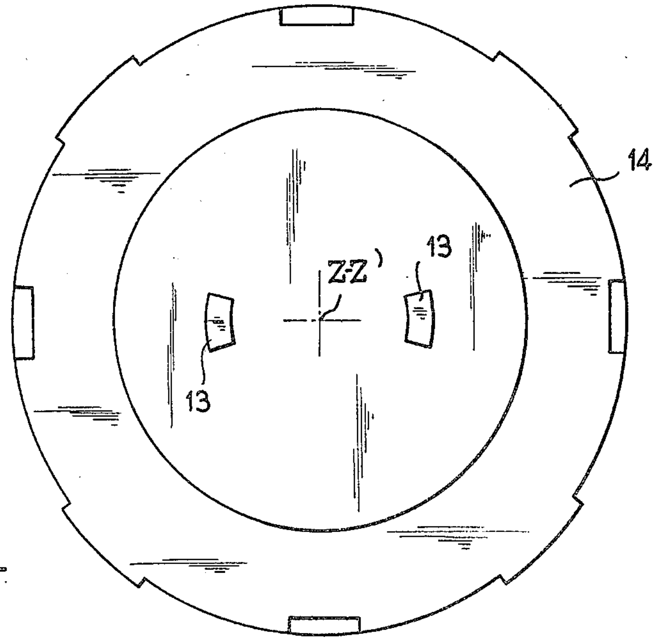
FIG. 8 is a view of the disc according to FIG. 6 from below.

Teeth 13 on disc 14 having 45° engagement ramps 13*a* (FIG. 9) allowing teeth 13 to be locked to complementary ramps 15*a* on teeth 15 of pinion 16 (FIG. 5). Locking is achieved by rotating disc 14 of fractioning element 9 in the direction of arrow F in FIG. 6.

Manual locking is effected by means of diametrical grip 18 on disc 14.

The unit described hereinbefore operates as follows: when the unit is used as a slicer, the product to be sliced is placed upon a carriage (not shown) located on surface 5 of base 4, and the said product is moved in the direction of the arrow towards circular blade 2, after the thickness of cut has been adjusted by moving support-surface 3*b* by means of an adjusting screw not visible in the drawing.

If a product is to be grated, base 4 is pivoted, towards support-means 1, about axis Y-Y', as shown is FIGS. 2 and 3. In this position, teeth 13 on disc 14 mesh with teeth 15 on pinion 16 to which blade 2 is secured. The electric motor is switched on, causing blade 2 and grater 9 to rotate simultaneously. The product to be grated is placed in funnel 10 and is pushed towards grater 9 by means of piston 12.

It will thus be seen that the slicer according to the invention may be converted into a grater or shaver merely by pivoting base 4 towards blade-support means 1, no further assembling being necessary.

When in use as a grater or shaver, the unit is very compact and may easily be stored in a kitchen cupboard.

It is to be understood that the invention is not restricted to the designs just described, but may be modified in many ways without departing from the scope of the invention.

Thus grater 9 may be replaced by a cylinder equipped with cutter-slots for shaving foodstuffs.

Fractioning element 9 may also be reversible, in which case it will have two distinct series of grating and/or shaving means arranged differently from each other in relation to the direction of rotation of the said element.

Funnel 10, instead of being arranged within the thickness of base 4 may be secured detachably to the surface of the base opposite surface 5, in which case the said base will be thinner than it is in the design illustrated.

Grater 9 may be in the form of a cylinder with two directions of rotation, acting in one direction as a grater and, in the other direction, as a shaver.

We claim:

1. A slicer for food products, comprising a circular blade rotating about a first axis in a support-means, a base having a surface adapted to accommodate the product to be sliced, the said surface running substantially parallel with said first axis, characterized in that the base is hinged about a second axis in relation to the support-means and comprises a fractioning element, such as a grater and/or shaver, adapted to rotate about a third axis at right angles to the said product-accommodating surface of the base, said third axis being located in a plane at right angles to said second axis and passing through said first axis, said first and third axes being located at the same distance from said second axis; and in that the fractioning element comprises means permitting it to be coupled, in rotation, to the blade, after the base has been pivoted towards the blade-support means.

2. A slicer according to claim 1, characterized in that the base comprises a feed-funnel for products to be fractioned.

3. A slicer according to claim 2, characterized in that the fractioning element, and the feed-funnel for products to be fractioned, are accommodated entirely within the thickness of the base.

4. A slicer according to claim 3, characterized in that the feed-funnel extends between the fractioning element and substantially one of the angles of the base facing said second axis.

5. A slicer according to one of claim 2, characterized in that the feed-funnel contains a piston for pushing the products towards the fractioning element, the outer surface of the said piston matching the external profile of the base.

6. A slicer according to claim 1, characterized in that the said means for coupling in rotation comprise teeth secured to the fractioning element and adapted to engage with teeth fixed to the blade, after the base has been pivoted toward the blade-support means.

7. A slicer according to claim 6, characterized in that the said teeth comprise means for locking them together.

8. A slicer according to claim 1, characterized in that the fractioning element is in the form of a hollow cylinder, the surface of which carries fractioning elements.

9. A slicer according to claim 1, characterized in that the fractioning element is mounted detachably in a cylindrical recess passing through the base.

10. A slicer according to claim 1, characterized in that the fractioning element is reversible and comprises two series of fractioning means arranged differently from each other in relation to the direction of rotation of the grating and/or shaving element.

11. A slicer according to claim 1, characterized in that the blade-support means and the base are substantially parallelepipeds and are of substantially identical dimensions.

12. A slicer according to claim 11, characterized in that when in use as a grater or shaver, the unit is a parallelepiped formed by superimposing the parallelepipeds of the support-means and the base.

13. A slicer according to claim 1, characterized in that the feed-funnel is secured detachably to the surface of the base facing the product-accommodating surface.

* * * * *